United States Patent [19]
Hassenplug, Jr. et al.

[11] Patent Number: 6,077,028
[45] Date of Patent: Jun. 20, 2000

[54] ROTATOR AND METHOD FOR ROTATING SHIPPING CONTAINER

[75] Inventors: Donald Lee Hassenplug, Jr., Herlong; Alfred Dean Higley, Janesville; Manuel Benedict Leslie; Ira Lewis Marcum, both of Herlong; Joseph Peter Stauffer, Janesville, all of Calif.; Joseph Robert Pavliga, Temple, Tex.

[73] Assignee: The United States of America as represented by the Secretary of the Army, Washington, D.C.

[21] Appl. No.: 09/229,890

[22] Filed: Jan. 14, 1999

[51] Int. Cl.⁷ .................................................... B65G 65/30

[52] U.S. Cl. ........................ 414/754; 280/408; 248/140

[58] Field of Search ................................... 414/754, 783; 280/408, 79.7, 79.2, 47.34; 248/131, 139, 140

[56] References Cited

U.S. PATENT DOCUMENTS

| | | | |
|---|---|---|---|
| 3,750,810 | 8/1973 | Stanfill | 414/754 |
| 4,351,541 | 9/1982 | Propst et al. | 280/408 |
| 4,676,339 | 6/1987 | Rybka et al. | 182/2 |
| 5,037,047 | 8/1991 | Chanko | 248/140 |
| 5,755,816 | 5/1998 | Schirmer et al. | 414/768 |

*Primary Examiner*—Gregory A. Morse
*Attorney, Agent, or Firm*—William Randolph; William Medsger; Edward Stolarun

[57] ABSTRACT

A rotator for holding and rotating a steel shipping container includes a main frame and a cradle frame attached to the main frame to allow relative rotation between the main frame and the cradle frame under the power of a hydraulic jack or the like. The container is secured to the cradle frame while the cradle frame is horizontal, and compressed air is supplied to the jack to tilt the cradle frame and the container for refurbishing. Pins are provided to hold the cradle frame in both the horizontal position and the tilted position.

14 Claims, 9 Drawing Sheets

“ROTATOR AND METHOD FOR ROTATING SHIPPING CONTAINER

FIELD OF THE INVENTION

The present invention is directed to a rotator for rotating any of several kinds of steel shipping containers for mechanical repair, welding, sandblasting and painting.

DESCRIPTION OF RELATED ART

Steel shipping containers are frequency refurbished. Typically, two kinds of containers are refurbished: "ISO-containers," which measure 8 feet wide by 8 feet high by 12 feet long and weigh approximately 4,600 pounds; and "tricons," which measure 6 feet wide by 6 feet high by 8 feet long and weigh approximately 2,700 pounds. The refurbishment performed on these containers typically includes mechanically repairing, welding, sandblasting and painting all six sides, as the containers may come in for refurbishment with faded paint, rust, holes, dents and missing parts.

A known method of positioning a container for refurbishment involves three or four workers using a Supertanker or 30 K forklift, two 6 K forklifts, nylon straps and wooden skids. The known method requires numerous steps. For instance, positioning the container on its side so that the top and bottom surfaces can be repaired requires the following eight steps:

1. The container is placed into the work area with the Supertanker or 30 K forklift.
2. Workers place the nylon straps around the container.
3. The container is lifted into the air by the straps with the 30 K forklift.
4. The workers position the skids under the raised container.
5. The workers tilt the container at an angle and signal the operator of the forklift to lower the container on its side onto the skids.
6. The two 6 K forklifts are used, one at the front of the container and one at the rear of the container, to lift the container.
7. The drivers of the two 6 K forklifts and a spotter move the container, with one driver driving forward and one driver driving backward, into a metalworking shop building.
8. Once the container is in the metalworking shop, the forklift drivers lower it and drive away. The metalworkers proceed to repair the container.

This eight-step operation may have to be repeated as many as three times, as the container has to be transported to the metalworking shop for repair and then to the paint shop for shotblasting and painting. Also, this eight-step operation is awkward and unsafe. It requires much labor, time and expense. If the operation is done incorrectly, the container can be damaged and therefore require rework.

SUMMARY OF THE INVENTION

An object of the present invention is to provide workers with safe and easy access to all sides of the container.

Another object of the invention is to reduce the labor, time and expense involved in refurbishing the container.

To achieve these and other objects, the present invention is directed to a rotator for holding and rotating a container, the rotator comprising: a main frame; a cradle frame attached to the main frame to allow relative rotation between the main frame and the cradle frame; container securing means for removably securing the container to the cradle frame; and rotating means for causing the relative rotation between the main frame and the cradle frame, the rotating means supplying a motive power sufficient to cause the relative rotation w%hen the container is secured to the cradle frame.

The present invention is further directed to a method of refurbishing a container, the method comprising: (a) providing a rotator which comprises a main frame, a cradle frame attached to the main frame to allow relative rotation between the main frame and the cradle frame, container securing means for removably securing the container to the cradle frame and rotating means for causing the relative rotation between the main frame and the cradle frame between a first relative position and a second relative position, the rotating means supplying a motive power sufficient to cause the relative rotation when the container is secured to the cradle frame; (b) securing the container to the cradle frame with the container securing means when the main frame and the cradle frame are in the first relative position; (c) causing the relative rotation to cause the main frame and the cradle frame to attain the second relative position; (d) performing a refurbishing operation on the container while the main frame and the cradle frame are in the second relative position; and (e) causing the relative motion to cause the main frame and the cradle frame to attain the first relative position.

BRIEF DESCRIPTION OF THE DRAWINGS

A preferred embodiment of the present invention will now be set forth in detail with reference to the drawings, in which.

DETAILED DESCRIPTION OF THE PREFERRED EMBODIMENT

Figure 1:
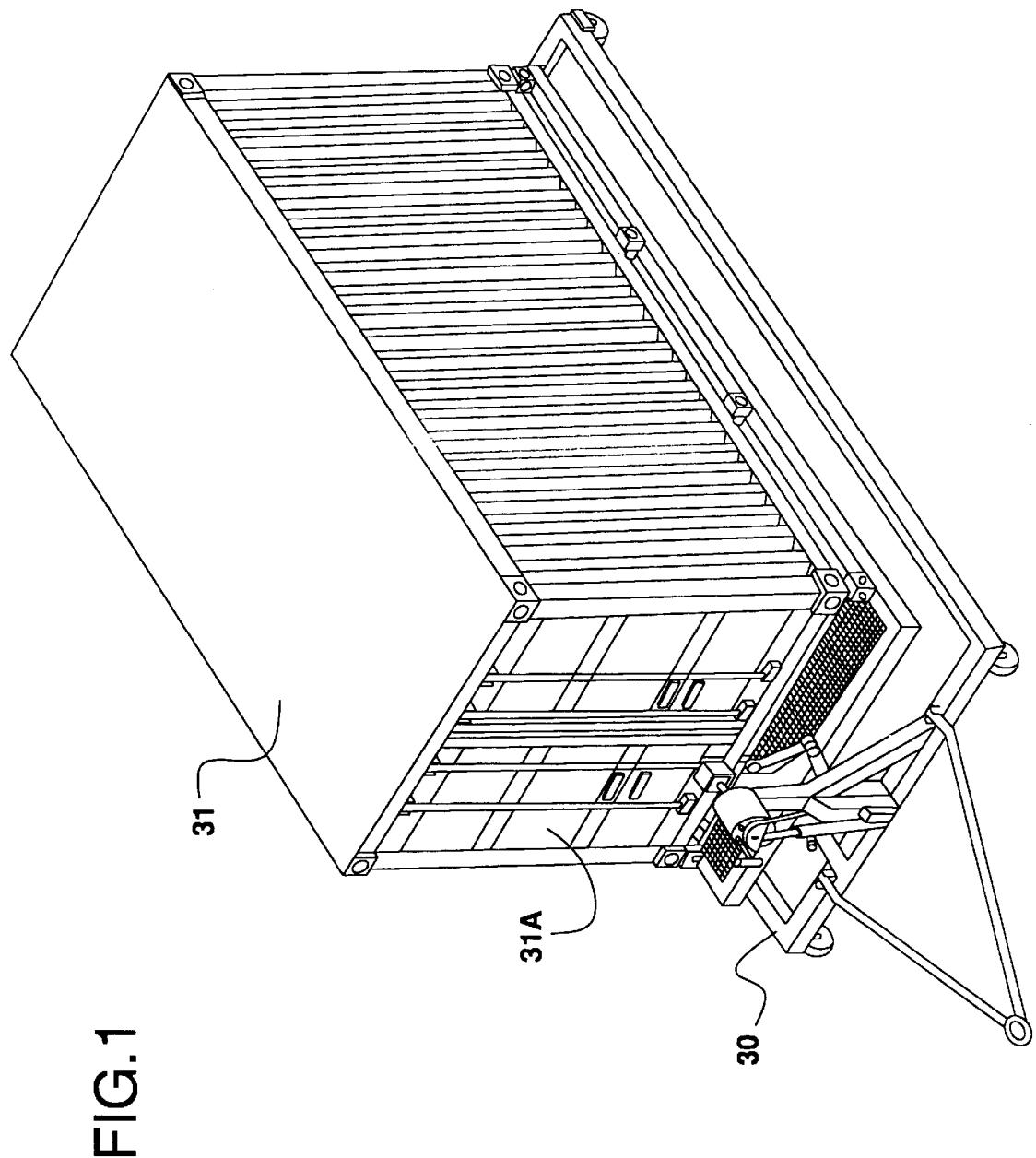
FIG. 1 shows an isometric view of a rotator according to the preferred embodiment holding a container in an upright position.
Figure 2:
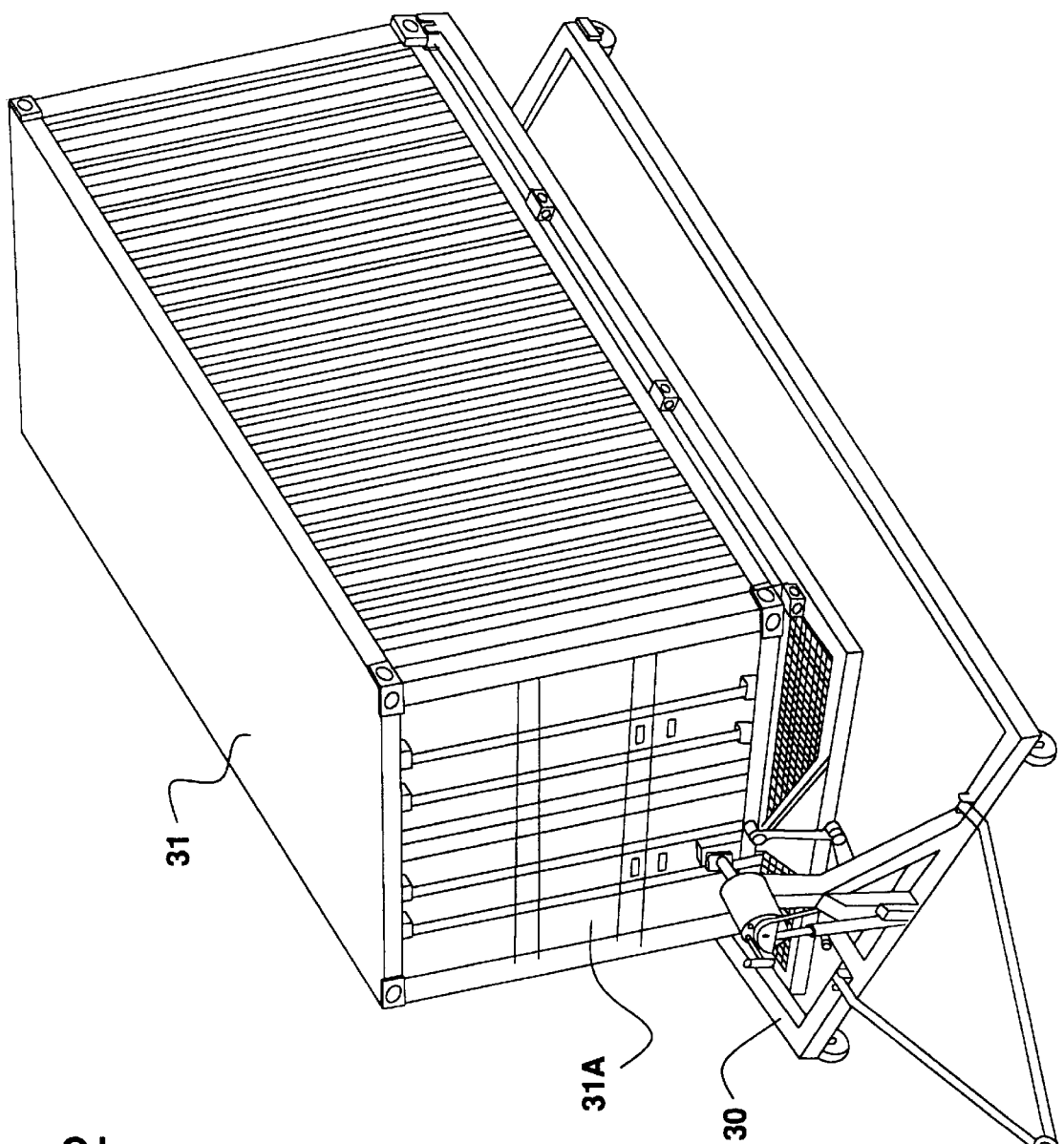
FIG. 2 shows an isometric view of the rotator of FIG. 1 holding the same container in a 45° position.

FIG. 1 shows an isometric view of rotator 30 supporting container 31 in an upright position. FIG. 2 shows an isometric view of rotator 30 supporting container 31 in a 45° position. Rotator 30 is shown in FIGS. 1 and 2 as being designed to conform to the dimensions of container 31, in which case other versions of rotator 30 can be designed to conform to the dimensions of other containers. Alternatively, rotator 30 can be designed to accommodate several sizes of containers.

Figure 3:
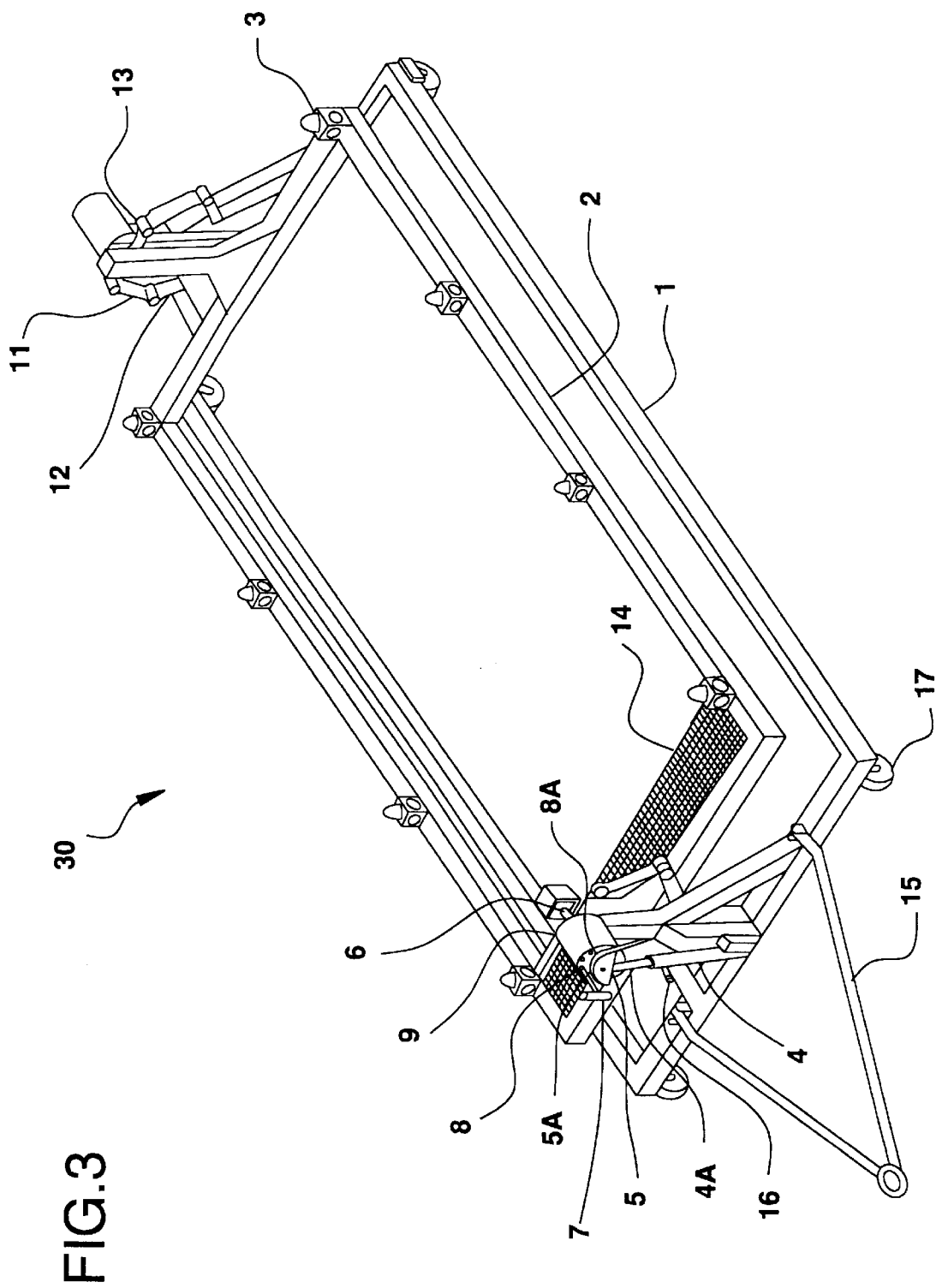
FIG. 3 shows an isometric view of the rotator of FIG. 1 without a container.
Figure 4:
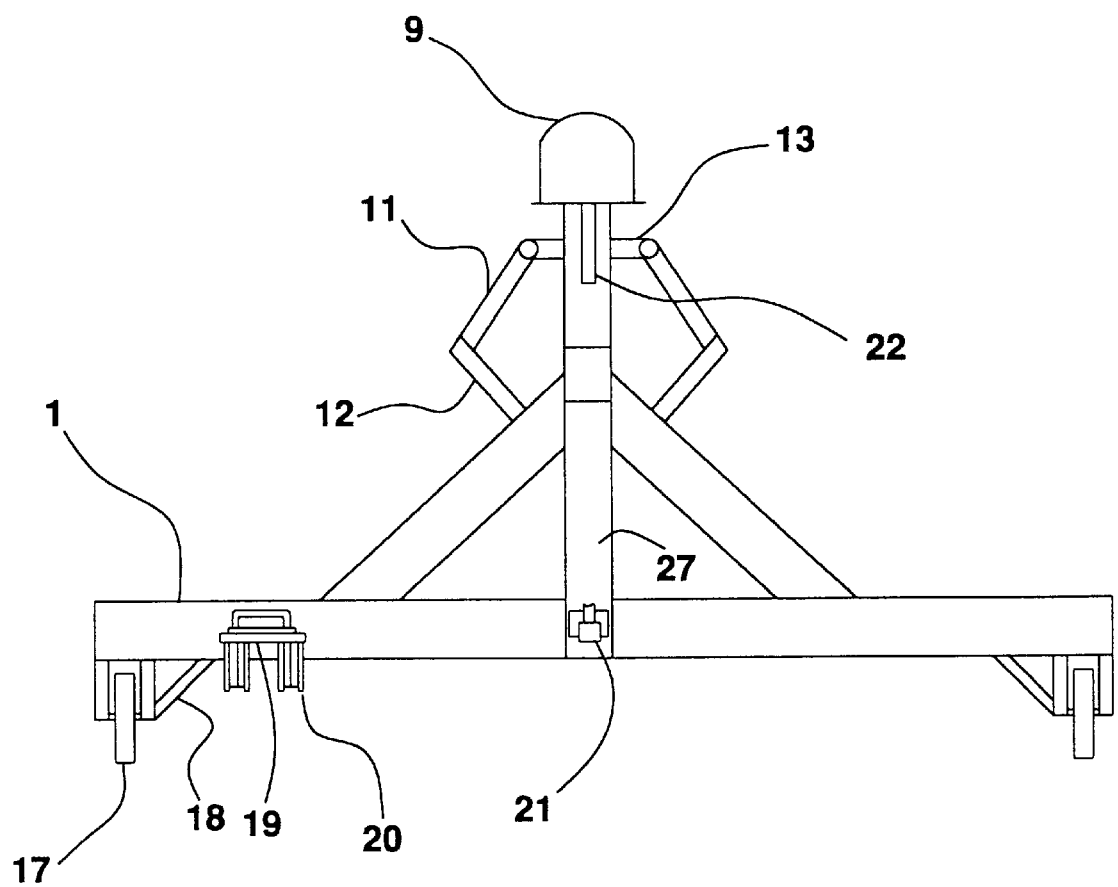
FIG. 4 shows a rear view of the rotator of FIG. 1 without a container.
Figure 5:
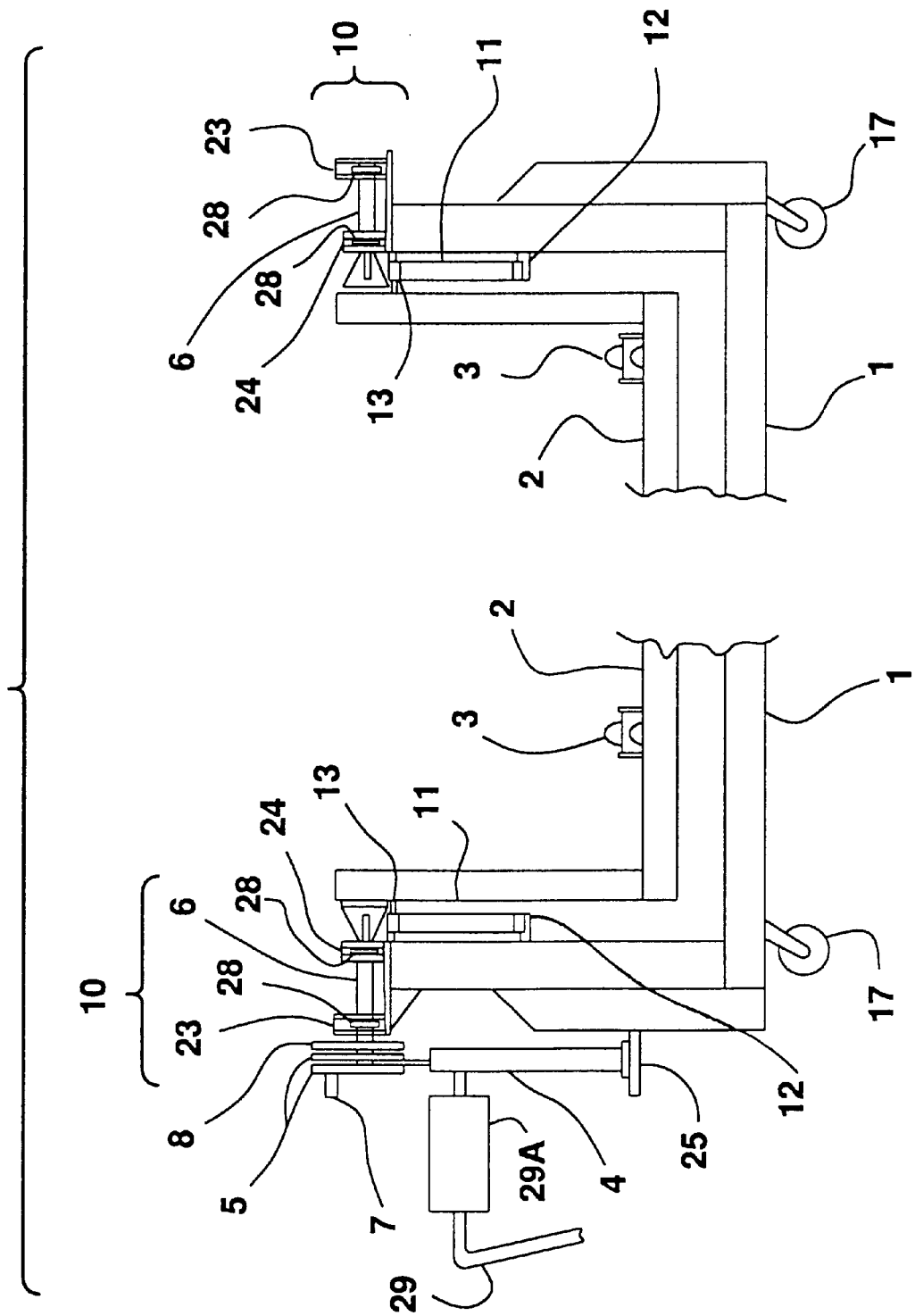
FIG. 5 shows a side view of the rotator of FIG. 1 without a container and dust cover.

The construction of rotator 30 is shown in FIGS. 3–5. Throughout this description, it will be understood that the designation of specific materials and of specific numbers of components is for illustrative purposes only and that other suitable materials or numbers of components can be provided.

Figure 7:
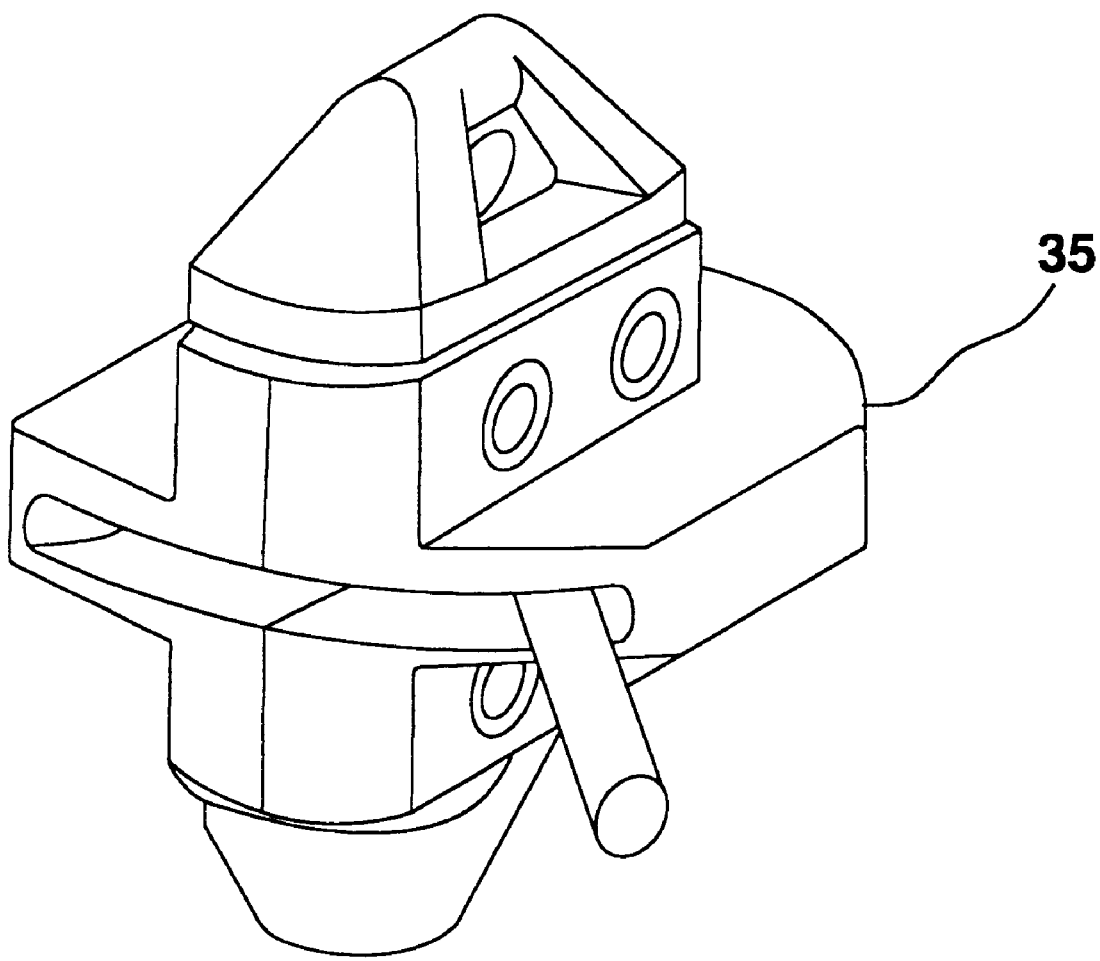
FIG. 7 shows a perspective view of a twistlock device.

As shown in FIG. 3, main frame 1 supports moving cradle frame 2. Each of main frame 1 and cradle frame 2 is made of six-inch steel tubing. Cradle frame 2 is provided with corner castings 3 to secure a container; while eight corner castings 3 are shown, the number can be varied to provide optimal support for a container. FIG. 7 depicts a twistlock device 35 that is inserted in a corner casting 3 and rotated to lock a container to the cradle frame 2.

Eight-ton hydraulic jack 4 is used to rotate cradle frame 2 relative to main frame 1. Hydraulic jack 4 has plunger 4A which is connected to two steel plates 5. Hydraulic jack 4 is configured to be connected to air line 29 to be actuated by compressed air supplied through air line 29 and air valve 29A. Air line 29 and air valve 29A do not have to be provided integrally with hydraulic jack 4 or with any other element of rotator 30. Instead, air line 29 and air valve 29A can be provided integrally with a stationary compressed air supply to which hydraulic jack 4 is detachably connected as needed through air line 29. Of course, a jack actuated by a liquid or in any other way could be used in place of hydraulic jack 4.

Figure 6:
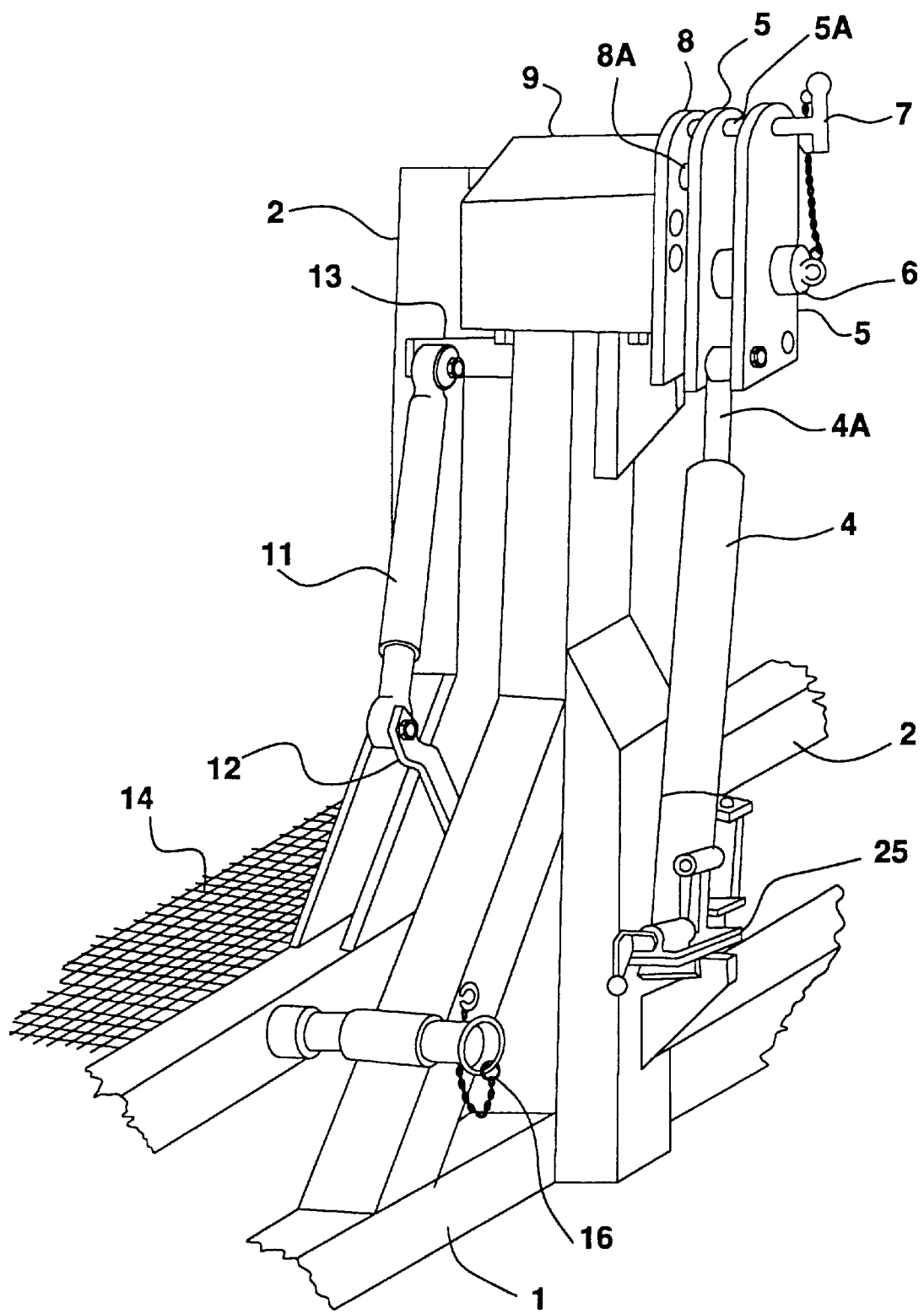
FIG. 6 shows a partial isometric view of the rotator.

As shown in FIG. 6, steel plates 5, of which two are provided in this embodiment, are welded to steel shaft 6, which is welded to cradle frame 2. The welding can be replaced with any other suitable securing mode. When cradle frame 2 is rotated into a desired position, steel locking pin 7 is inserted through holes 5A in steel plates 5 and through holes 8A in steel plate 8 to secure cradle frame 2.

Ball bearing dust cover 9 is made of mild steel sheet metal and protects sealed ball bearing assembly 10 shown in FIG. 5 from dust, paint and shotblast media in the front and the rear of rotator 30. Four shock absorbers 11 dampen the motion of cradle frame 2. Four steel brackets 12 structurally connect shock absorbers 11 to main frame 1 in the front and the rear of rotator 30.

Steel brackets 13 structurally connect the upper portions of shock absorbers 11 to cradle frame 2 at the rear only. Steel grating 14 is a platform which provides the workers with access to doors 31A of container 31; alternatively, any other means can be provided to allow the workers to get from the ground to the interior of the container and back. Tow bar 15 is provided to allow towing of rotator 30. As shown in FIG. 6, steel pin 16 is used to secure cradle frame 2 to main frame 1 in the horizontal position. Casters 17 or other suitable rolling devices can be attached to each corner of main frame 1.

As shown in FIG. 4, casters 17 are structurally supported by steel plates 18 welded to casters 17 and main frame 1. Of course, if rolling devices other than casters are used, other structural supports can be provided. Steel flatbar 19 is welded to main frame 1 to hold caster chock 20. Caster chock 20 is a U-shaped device made of two pieces of 2-inch steel angle iron, a 2-inch flat bar and a ⅜-inch diameter roundstock for the handle. Caster chock 20 is placed against one of casters 17 to keep rotator 30 from moving. Pindle hook 21 is welded to steel tubing upright 27 to enable two rotators 30 to be attached together to be towed at the same time. Triangular steel bracket 22 is welded to main frame 1 to support ball bearing assembly 10.

As shown in FIG. 5, ball bearing holders 23 and 24 each hold one sealed ball bearing 28 in place. Steel plate 25 is welded to main frame 1 and supports hydraulic jack 4. As shown in FIG. 5 and FIG. 6, the lower portions of the shock absorbers 11 are connected to the main frame with brackets 12. The upper portions of the shock absorbers 11 are connected to the cradle frame 2 with a bracket 12 at the front and bracket 13 at the rear.

The operation of rotator 3o will be described with reference to the flow charts of FIGS. 8–11. This operation is performed by one forklift/tractor operator and one spotter/mechanic using one forklift and one rotator 30.

Figure 8:
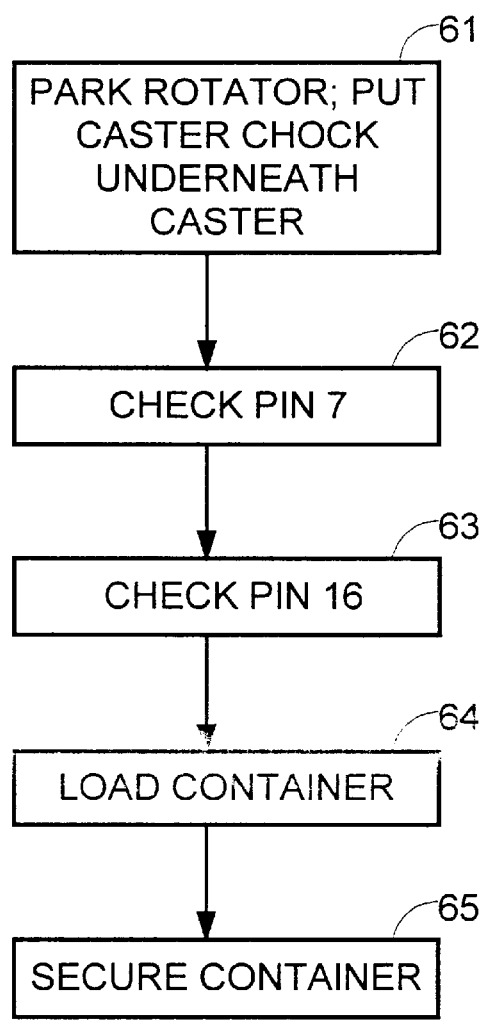
FIG. 8 shows a flow chart of steps involved in placing the container onto the rotator.

FIG. 8 shows the steps involved in placing container 31 onto rotator 30. In step 61, rotator 30 is parked in position, and caster chock 20 is placed underneath one of casters 17 to secure rotator 30 in its position. In step 62, it is checked to see whether pin 7 is inserted in steel plates 5 and 8. In step 63, it is checked to see whether steel pin 16 is inserted into main frame 1 and cradle frame 2. In step 64, container 31 is loaded into cradle frame 2. In step 65, container 31 is secured onto cradle frame 2 by locking container 31 to corner casting 3 at each corner, using twistlock devices 35.

Figure 9:
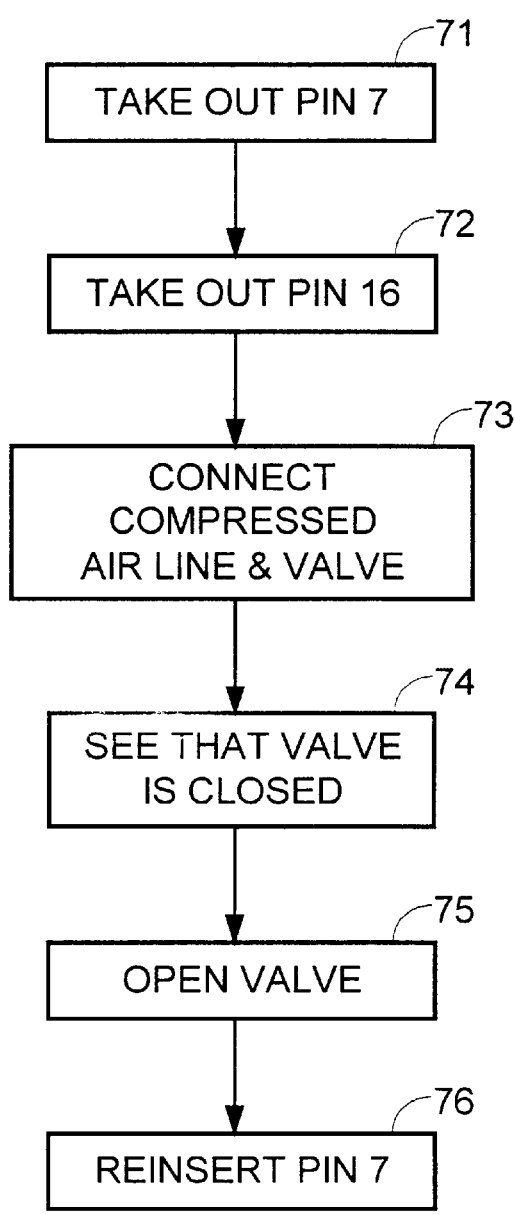
FIG. 9 shows a flow chart of steps involved in rotating the container into the desired position.

FIG. 9 shows the steps involved in rotating container 31 into the desired position. In step 71, steel pin 7 is taken out to disengage steel plates 5 from steel plate 8. In step 72, steel pin 16 is taken out to disengage main frame 1 from cradle frame 2. In step 73, air line 29 and valve 29A are connected to hydraulic jack 4. In step 74, it is checked to see whether air valve 29A is closed. In step 75, air valve 29A is opened to actuate hydraulic jack 4 to rotate container 31 into the desired position. In step 76, once container 31 has been rotated into the desired position, cradle frame 2 is secured to main frame 1 by re-inserting steel pin 7 into steel plates 5 and 8. After the operations of FIGS. 8 and 9 have been performed, container 31 is held in the desired position and may thus be refurbished as needed. Container 31 can also be moved when secured to rotator 30, simply by towing rotator 30 with a tug or other suitable device. Then container 31 is taken down from the desired position through the operations of FIGS. 10 and 11.

Figure 10:
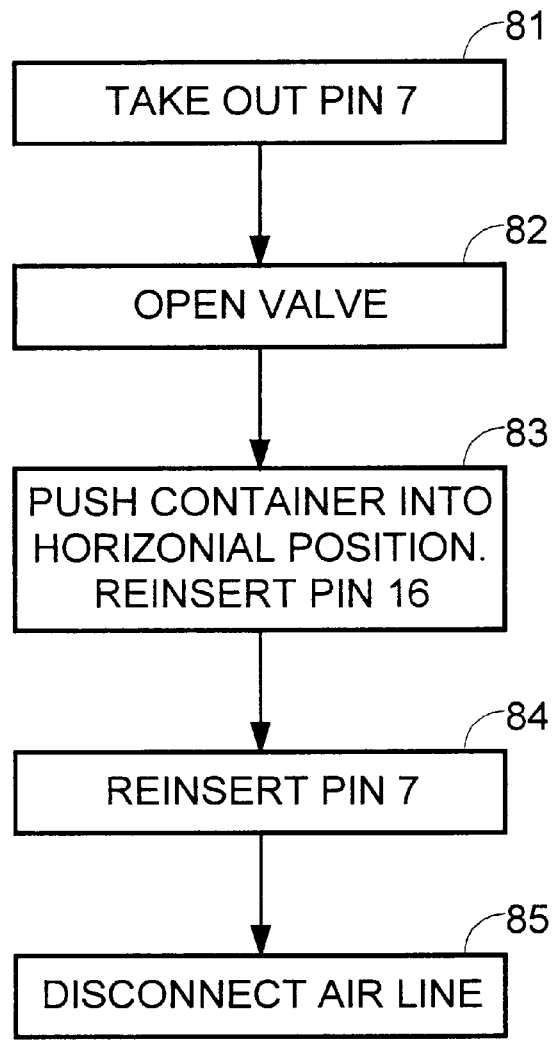
FIG. 10 shows a flow chart of steps involved in rotating the container back into the horizontal position.

FIG. 10 shows the steps involved in rotating container 31 back into the horizontal position. In step 81, steel pin 7 is taken out of steel plates 5 and 8. In step 82, air valve 29A is opened to release the hydraulic pressure from hydraulic jack 4 so that container 31 can freely rotate. Cradle frame 2 will normally gravitate very closely to the horizontal position. In step 83, container 31 is manually pushed, typically several inches, into the horizontal position so that steel pin 16 can be re-inserted into main frame 1 and cradle frame 2. In step 84, steel pin 7 is re-inserted into steel plates 5 and 8. In step 85, compressed air line 29 is disconnected from hydraulic jack 4.

Figure 11:
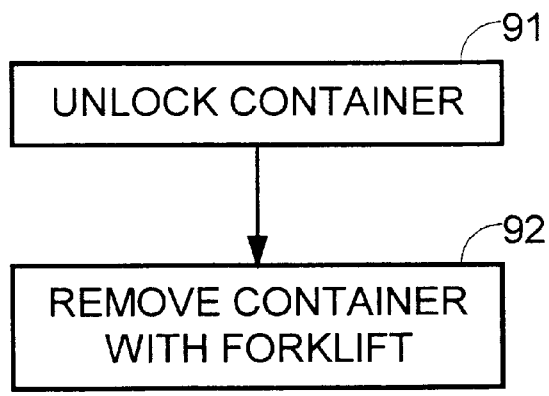
FIG. 11 shows a flow chart of steps involved in removing the container from the rotator.

FIG. 11 shows the steps involved in removing container 31 from rotator 30. In step 91, container 31 is unlocked from corner castings 3. In step 92, the forklift/tractor operator drives the forklift under container 31 and removes container 31 from rotator 30.

The rotator and method according to the present invention offer the following advantages. The total time to transport and position container 31 is reduced by 95% from two days to one hour; this figure includes savings in material handling time and waiting time for the availability of material handling equipment. The number of material handling moves is reduced by 88% from eight moves to one. The use of material handling equipment is reduced by 33% from three to two pieces of equipment. The number of personnel required is reduced by 67% from three persons to one. The annual material handling costs are reduced by 88%. A tug or 6 K forklift can be used to transport container 31 from the metalworking shop to the paint shop, typically two hundred feet, whereas two 6 K forklifts were required in the prior art. Handling of container 3 is more user-friendly, simpler and safer.

We claim:

1. A rotator for holding and rotating a container from a first position to a plurality of different locked positions for servicing, the rotator comprising:

a main frame;

a cradle frame attached to the main frame to allow relative rotation between the cradle frame and the main frame;

container securing means attached to the cradle frame for removably securing the container to the cradle frame;

rotating means connected to the main frame and the cradle frame for causing the relative rotation between the main frame and the cradle frame from a first position where the cradle frame and the main frame are substantially parallel to a plurality of different positions, the rotating means supplying a motive power sufficient to cause the relative rotation when the container is secured to the cradle frame; and locking means connected to the main frame and the cradle frame for holding the cradle frame and the container at a selected one of the different positions with respect to the main frame, wherein the locking means comprises a first plate attached to the main frame, with the first plate having at least one first hole formed therein, a second plate attached to the cradle frame, with the second plate having a plurality of holes formed therein, and a pin for insertion into the at least one first hole of the first plate and a selected one of the plurality of holes of the second plate for locking the cradle frame at a selected position.

2. A rotator for holding and rotating a container from a first position to a plurality of different positions for servicing, the rotator comprising:

a main frame;

a cradle frame attached to the main frame to allow relative rotation between the main frame and the cradle frame;

container securing means attached to the cradle frame for removably securing the container to the cradle frame;

rotating means connected to the main frame and the cradle frame for causing the relative rotation between the main frame and the cradle frame from a first relative position where the cradle frame and the main frame are substantially parallel to a plurality of different positions where the cradle frame is positioned at an angle with respect to the main frame, the rotating means supplying a motive power sufficient to cause the relative rotation when the container is secured to the cradle frame; and a first locking means connected to the main frame and the cradle frame for holding the cradle frame and the container at a selected one of the different positions with respect to the main frame.

3. A rotator as in claim 2, wherein the container securing means comprises a plurality of castings on the cradle frame for being locked to the container.

4. A rotator as in claim 2, wherein the rotating means comprises a jack attached to the main frame and the cradle frame such that actuation of the jack causes the relative rotation.

5. A rotator as in claim 4, wherein the jack is a hydraulic jack.

6. A rotator as in claim 5, wherein the jack is actuated by compressed air.

7. A rotator as in claim 4, wherein the first locking means comprises:

a first plate attached to the main frame, the first plate having at least one first hole formed therein;

a second plate attached to the cradle frame, the second plate having a plurality of holes formed therein; and a pin for insertion in to the at least one first hole of the first plate and a selected one of the plurality of holes of the second plate for locking the cradle frame at a selected position relative to the main frame.

8. A rotator as in claim 2, wherein the first locking means comprises:

a first plate attached to the main frame, the first plate having at least one first hole formed therein;

a second plate attached to the cradle frame, the second plate having a plurality of holes formed therein; and a pin for insertion into the at least one first hole of the first plate and a selected one of the plurality of holes of the second plate for locking the cradle frame at a selected position relative to the main frame.

9. A rotator as in claim 8, wherein the plurality of holes in the second plate are arranged in an arcuate pattern.

10. A rotator as in claim 8, further comprising a second locking means connected to the main frame and the cradle for locking the cradle frame and the container in the first relative position where the cradle frame and the main frame are substantially parallel to each other.

11. A rotator as in claim 2, further comprising wheel means attached to the main frame for supporting the rotator on a surface, as to allow the rotator to be moved over the surface.

12. A rotator as in claim 2, further comprising coupling means for detachably coupling the rotator to a second rotator.

13. A method of refurbishing a container, the method comprising:

(a) providing a rotator which comprises a main frame, a cradle frame attached to the main frame to allow relative rotation between the main frame and the cradle frame, container securing means for removably securing the container to the cradle frame, rotating means for causing the relative rotation between the main frame and the cradle frame between a first relative position and a plurality of different relative positions, the rotating means supplying a motive power sufficient to cause the relative rotation when the container is secured to the cradle frame, and locking means connected to the main frame and the cradle frame for locking the cradle frame and the container in-place at a selected relative position;

(b) securing the container to the cradle frame with the container securing means when the main frame and the cradle frame are in the first relative position with the main frame and the cradle frame disposed substantially parallel to each other;

(c) causing the rotation of the cradle frame and the container relative to the main frame from the first relative position to one of a plurality of different relative positions;

(d) locking the cradle frame and the container at the selected relative position;

(e) performing a refurbishing operation on the container while the main frame and the cradle frame are locked at the selected relative position;

(f) unlocking the cradle frame and the container upon completion of the refurbishing operation; and (g) causing the relative rotation of the cradle frame and container from the selected relative position to the first relative position.

14. A method as in claim 13, further comprising, after steps (a)–(g):

(h) moving the rotator with the container secured to the cradle frame to a location different from the location in which step (e) was performed;

(i) causing the relative rotation to cause the main frame and the cradle frame to rotate from the first relative position to a selected relative position;

(j) locking the cradle frame and the container at the selected position; and (k) performing a further refurbishing operation on the container while cradle frame and the container are in the selected relative position.

* * * * *